United States Patent [19]

Lowther

[11] 4,327,688

[45] May 4, 1982

[54] CYLINDER PRESSURE CONTROL OF FLUID INJECTION IN AN INTERNAL COMBUSTION ENGINE

[75] Inventor: Frank E. Lowther, Buffalo, N.Y.

[73] Assignee: Purification Sciences Inc., Geneva, N.Y.

[21] Appl. No.: 140,767

[22] Filed: Apr. 16, 1980

[51] Int. Cl.³ .......................... F02M 39/00; F02P 5/04

[52] U.S. Cl. .................................... 123/435; 123/425; 123/475; 239/87

[58] Field of Search ............... 123/435, 425, 475, 261, 123/494, 436, 340, 478, 489; 239/87

[56] References Cited

U.S. PATENT DOCUMENTS

| | | | |
|---|---|---|---|
| 2,220,558 | 11/1940 | Van Disck et al. | 123/425 |
| 2,572,118 | 10/1951 | Dickson | 239/87 |
| 3,941,100 | 3/1976 | Bensch et al. | 123/475 |
| 4,096,841 | 6/1978 | Kindermann et al. | 123/445 |
| 4,116,175 | 9/1978 | Sand | 123/425 |
| 4,153,019 | 5/1979 | Lanberstein et al. | 123/425 |
| 4,205,337 | 5/1980 | Ayama et al. | 123/494 |
| 4,216,753 | 8/1980 | Inoue et al. | 123/445 |
| 4,261,315 | 4/1981 | Geiger et al. | 123/435 |

*Primary Examiner*—Raymond A. Nelli
*Attorney, Agent, or Firm*—Robert J. Bird

[57] ABSTRACT

Certain reciprocating piston internal combustion engines have liquid oxidant and liquid fuel injection schedules that are controlled by a microprocessor that acts upon pre-stored data and upon engine sensor output data. For these engines, the present invention provides a pressure sensor in the working cylinder combustion chamber whose output controls the injection initiation times.

2 Claims, 3 Drawing Figures

CYLINDER PRESSURE
P₀
A
B
C
Δθ
INJECTION RATE
Max
0
C
Max
0
B
Max
0
A
TDC
PISTON POSITION

CYLINDER PRESSURE CONTROL OF FLUID INJECTION IN AN INTERNAL COMBUSTION ENGINE

BACKGROUND OF THE INVENTION

Hydrocarbon fueled internal combustion engines have been proposed that utilize cryogenic liquid, storable liquid, or highly compressed stored gaseous oxidants. Ideally, only incidental compression is to be done in the working cylinder of these non-air breathing internal combustion engines. Liquids (fuel and/or oxidant) injected into the cylinder too early in the cycle will vaporize prior to top dead center (TDC) and, therefore, present an undesirable back pressure (compression) on the piston, connecting rod, and crankshaft. Liquids injected too late will not vaporize and hence combust, until after TDC and, therefore, waste valuable expansion ratio.

A finite length of time will be required to vaporize liquids injected into the engine combustion chamber. Complete combustion requires complete vaporization. Vaporization time will be somewhat uncertain and depends upon many factors: degree of liquid atomization when injected, nature of the liquid, method and location of injection, temperature and thermal characteristics of the combustion chamber, amount and temperature of the clearance gas, etc.

PRIOR ART DESCRIPTION

A considerable amount of prior art exists in the electronic control of liquids injected into internal combustion engines. Diesels require that fuel oil be injected into the cylinder containing air at pressures of 50 atmospheres, or more. Gasoline engines inject the liquid fuel into the inlet manifold at relatively low pressures (approximately 1 atmosphere). Electronic control units (ECU) are commonplace, wherein an electronic microprocessor, fed by engine sensors, controls the injection process.

The prior art controls the duration of injection by controlling the pulse width of the signal to the solenoid operated injector or piezoelectric injector. However, injection advance or delay corrections may be made for ambient atmospheric pressure changes, engine load, etc. U.S. Pat. No. 4,180,021 (Yanagihara) teaches an injection start schedule that depends upon engine load. A Chrysler Patent, U.S. Pat. No. 4,180,022 teaches piezoelectric injectors and U.S. Pat. No. 4,180,037 (Hobo) uses electromagnetic (solenoid) injectors. The following chart presents a list of microprocessor/sensor injection control patents in response to the sensed function indicated:

| U.S. Pat. No. | Sensed Function |
|---|---|
| 4,181,944 Yamauchi | Engine wear |
| 4,184,460 Harada | Starting conditions |
| 3,612,008 Belshir | Intake manifold pressure |
| 3,818,877 Barrera | Mass of entering air |
| 4,172,433 Bianchi | Throttle plus RPM |
| 4,172,434 Coles | Engine vibration |
| 4,173,953 Rocholle | Air flow rate plus RPM |
| 4,173,957 Hattiori | Air/Fuel ratio |
| 4,173,956 Ikeura | Engine state: Idle, Accel., Steady |
| 4,174,681 Luchaco | Low speed/Normal speed |
| 4,174,694 Wessel | Air mass rate plus Fuel temp. |
| 4,176,625 Stauffer | Crank revolution |
| 4,180,020 Reddy | Starting transients |

The prior art controls the amount of fuel injected per stroke by controlling how long the injection device is open and injecting fluid. The present invention builds upon the prior art. The inventive feature is that the injection initiation time is made to be responsive to working cylinder pressure at or near TDC.

SUMMARY OF THE INVENTION

The present invention includes methods and apparatus to control injection initiation of liquids into the working cylinders of an internal combustion engine in response to cylinder gas pressure at or near TDC. The said liquids include hydrocarbon fuels, oxidants, and dilutants.

It is an object of this invention to control said injection initiation times in such a manner to minimize gas phase compression during the engine piston upstroke near TDC, while at the same time maximizing piston expansion ratio on the downstroke.

It is yet another object of this invention to accomplish said injection initiation time control in conjunction with standard electronic microprocessor/sensor control of fluids injection in response to throttle setting, fuel temperature, starting conditions, idle state, acceleration profile, etc.

These and other objects and features of the invention will be apparent to a skilled scientist by reference to the following description and drawings.

DRAWING

DETAILED DESCRIPTION

The following description concerns one piston and one cylinder. It is understood that the invention and its principles apply to multi-cylinder engines of the in-line, V, radial, and other designs.

Many of the usual engine "housekeeping" functions and devices are not shown: crankcase, crankshaft, lubrication system, cooling system, etc. The usual ignition starting functions, electric battery connection to the microprocessor or electronic control unit (ECU), battery connections and logic to the electric pumps, and similar electrical details are not shown. This simplification allows a more clear focus to be made on the invention proper: control of injection initiation by cylinder pressure at or near TDC.

Figure 1:
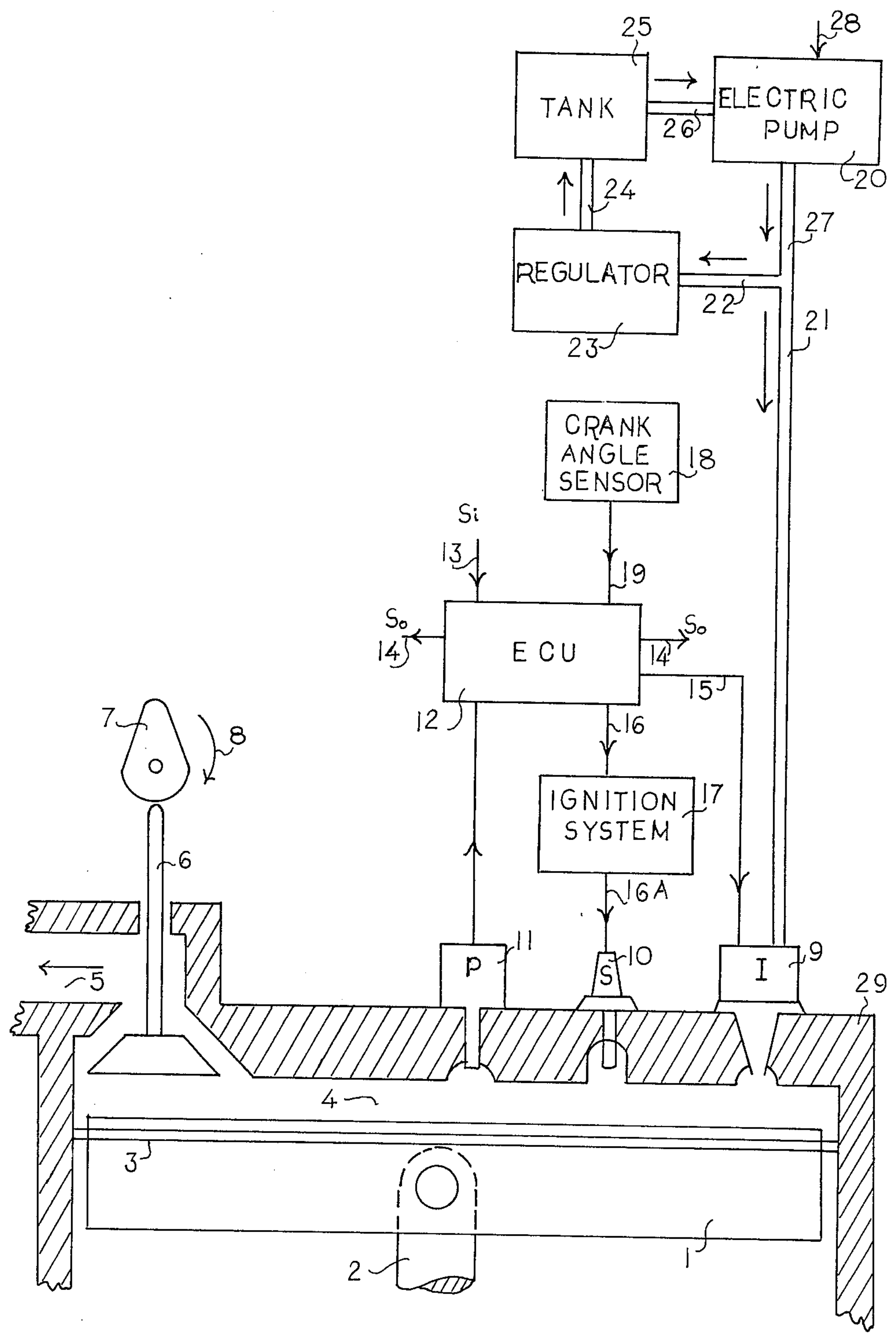
FIG. 1 is a partly schematic, partly functional diagram of a mono-propellant system according to the present invention.

FIG. 1 shows a partly schematic and partly functional diagram of a "monopropellant" system. Piston 1, including connecting rod 2 and piston rings 3, moves in working cylinder 29 which includes exhaust port 5 controlled by exhaust valve 6 actuated by cam 7 rotating in direction 8. In communication with combustion space volume 4 and pressure sensor 11, spark or glow plug 10, and monopropellant injector 9. Spark or glow plug 10 is indicated as localized but may include, for example, an area or line hot source such as a glowing wire or plate. The pressure sensor 11 may be a piezoelectric transducer or similar device protected to withstand the high combustion peak temperature and feeds its output to the microprocessor system 12. The crank angle sensor 18 allows the pressure data from pressure transducer 11 to be sampled at the appropriate time. Crank angle sensor 18 may be an 8-bit code wheel, for example, thereby resolving angles of the crank to about 1.5 degree. Preferably, crank angle sensor 18 utilizes a standard grey code to minimize mechanical switchings.

The electronic control unit 12 receives other inputs 13 which will include temperatures, throttle settings, RPM, etc. The ECU 12 controls the injector 9 via electrical conductor 15. The ECU 12 may control additional devices such as electric pumps 20, injectors for additional cylinder injectors, etc. Monopropellant injector 9 may be of the piezoelectric or electromagnetic solenoid type. Additional control outputs from ECU 12 are shown as 14 in FIG. 1.

Monopropellant tank 25 may contain fuel, oxidizier, and dilutant as a mixture, emulsion, or dispersion. Electric pump 20 sucks monopropellant from tank 25 via pipe 26 and delivers monopropellant to injector 9 via pipe 21. Regulator 23 returns excess monopropellant from pump 20 output via pipe 22 and delivers excess monopropellant back to storage tank 25 via pipe 24. Electric signal 28 controls electric pump 20 and may consist of main battery connection (not shown) made via ECU 12.

The logic and truth table that relates injection initiation time to crank angle and cylinder pressure are stored in memory in ECU 12. This criteria will be discussed later in the present specification. The ECU 12 controls the ignition electrical system 17 via electrical conductor 16. The ignition system supplies energy to ignition device 10 via electrical conductor 16A. Typically, ignition system 17 includes a high voltage and is timed, by ECU, to coincide with the vaporization processes at or near TDC. The ignition device 10, in one embodiment, may contain a glow plug that aids and speeds up the fluid's vaporization process.

Figure 2:
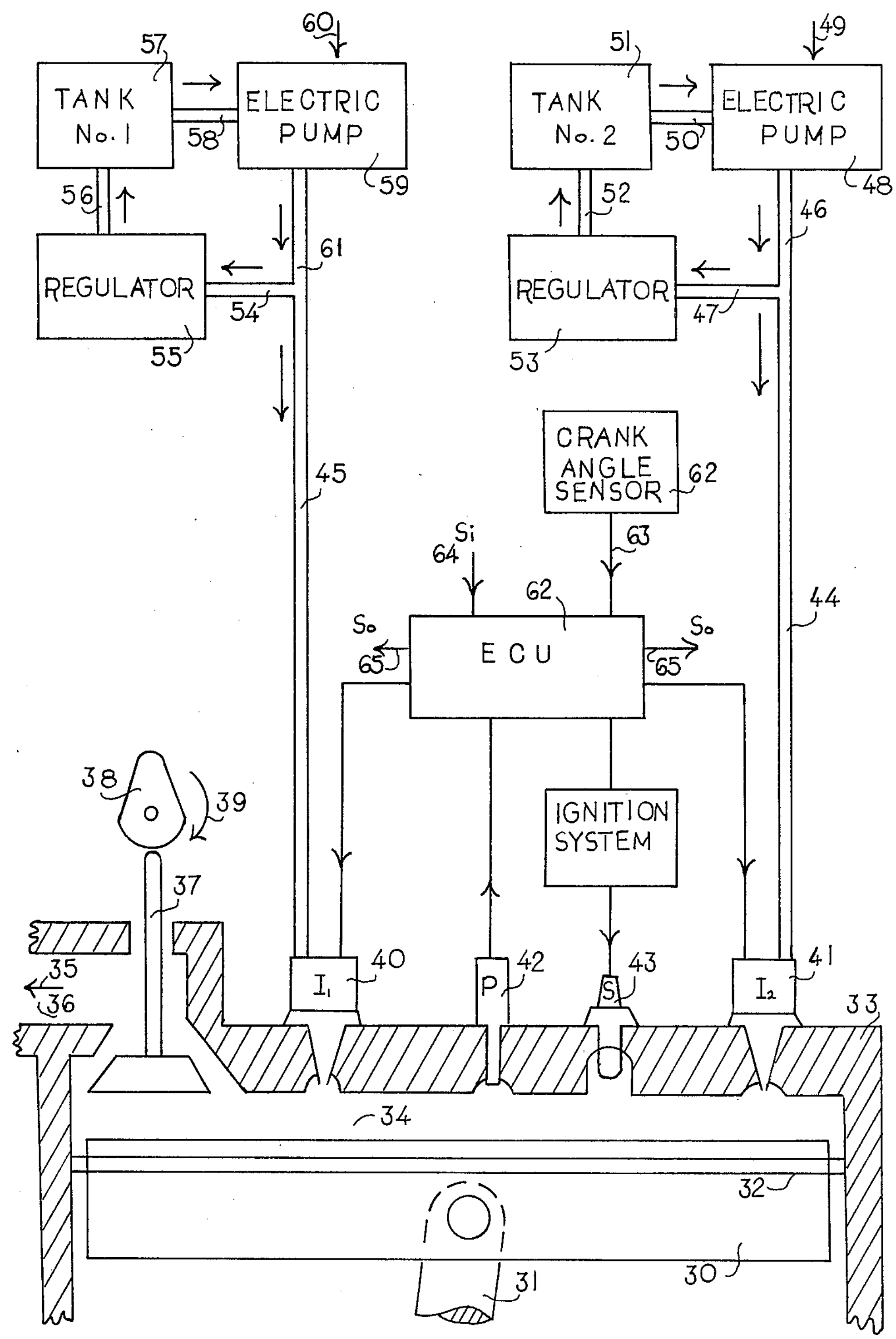
FIG. 2 is a partly schematic, partly functional diagram of a two-propellant system according to the present invention.

FIG. 2 illustrates a two fluids embodiment of the present invention. Piston 30, with connecting rod 31 and piston rings 32, moves in cylinder 33 which contains exit port 36 containing exhausting gases of combustion 35. Exhaust port 36 is controlled by exhaust valve 37 which is operated by cam 38 with direction of rotation 39. Liquid injectors 40 and 41, pressure transducer 42, and ignition device 43 are in communication with combustion chamber 34. The characteristics of 42 and 43 and their relationship to ECU 62 are similar to the counterparts 11, 10, and 12 in FIG. 1. The ECU 62 has additional inputs 64 and outputs 65 similar to the counterparts of FIG. 1. Crank angle sensor 62 feeds digital angle data to ECU 62 via lines 63. The crank angle data may be 8-bit grey code, for example. Electric pump 59 sucks fluid from tank 57 via pipe 58 and delivers fluid under pressure to pipe 61 which, in turn, feeds injector 40 and regulator 55 via pipes 45 and 54 respectively. Regulator 55 returns excess fluid to tank 57 via pipe 56. Typically, tank 57 contains a hydrocarbon fuel such as gasoline or kerosene.

Electric pump 48 delivers high pressure fluid to pipe 46 after sucking fluid from tank 51 via pipe 50. Pipe 46, in turn, feeds injector 41 via pipe 44, and regulator 53 via pipe 47. Regulator 53 returns excess fluid to storage tank 51. Typically, tank 51 contains an oxidizer and dilutant: nitric acid plus water, or an ammonium nitrate and water solution. Pumps 59 and 48 are driven by electrical energy in lines 60 and 49 respectively.

Figure 3:
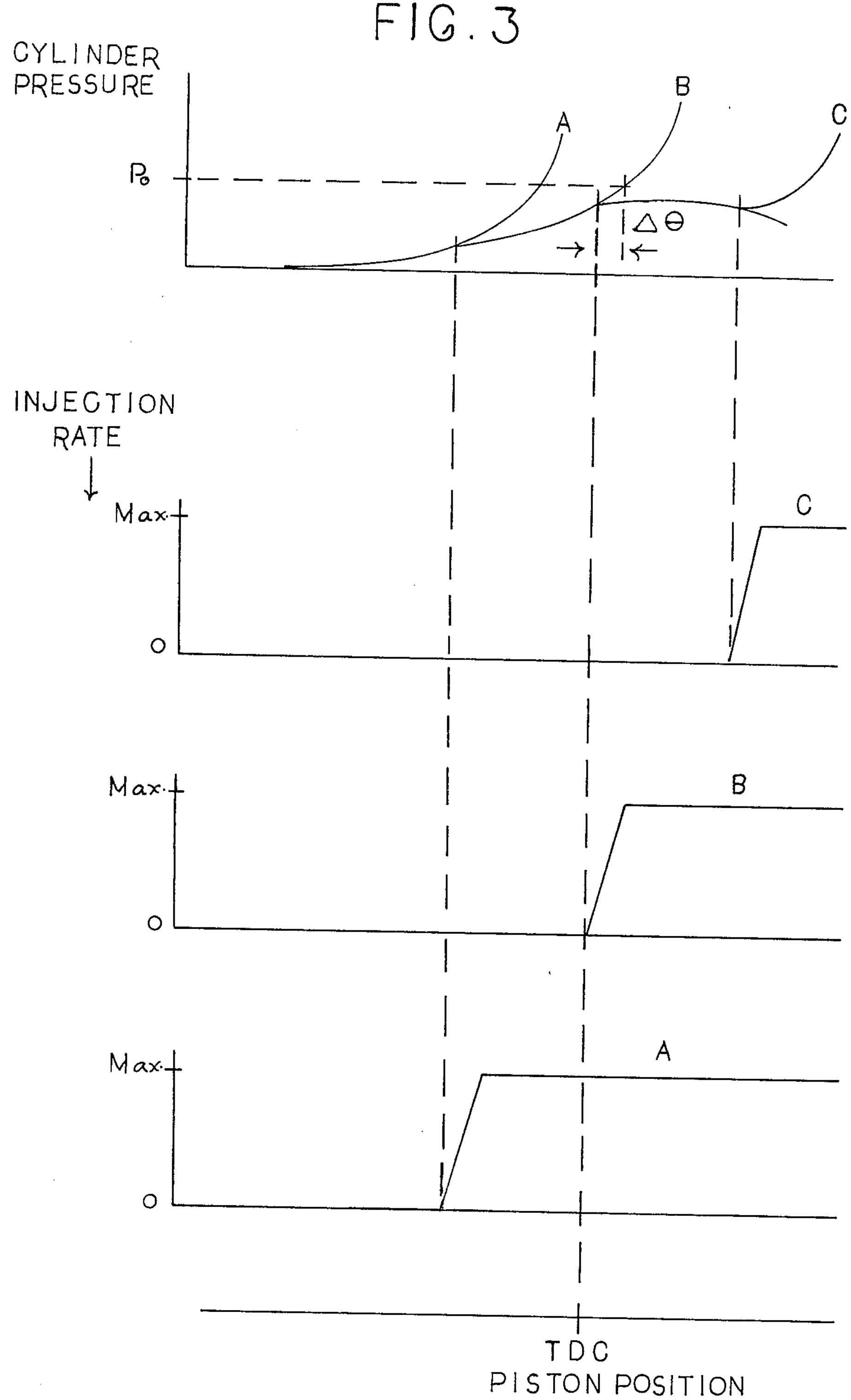
FIG. 3 is a family of curves plotting cylinder pressure against piston position with three different propellant injection schedules.

FIG. 3 illustrates the logic to be built into the microprocessor units 62 (FIG. 2) and 12 (FIG. 1). The A curve in FIG. 3 represents injection starting before TDC. The B curve in FIG. 3 represents injection starting at TDC. The C curve represents injection starting after TDC. The top curve shows the cylinder pressure traces for the three cases (A,B,C). The horizontal scale in FIG. 3 is perhaps 20 Degrees either side of TDC. The early pressure build-up (prior to injection initiation in Case A) is due to compression of clearance gas and will depend upon efficiency of the exhaust blowers, etc. Inherent in the ECU logic is that no injection proceeds with the exhaust valve open.

The $P_o$ level shown in FIG. 3 is that acceptable cylinder pressure when the piston is at TDC. Any pressure above or below $P_o$ at TDC is unacceptable. If ignition were commenced according to curve A, i.e., premature, then cylinder pressure will be much greater than the prescribed limit P at TDC. If the ignition is delayed (Case C) then too low a cylinder pressure will result at TDC. The Case B (TDC initial injection) shows a slight pressure deficit at TDC and, in fact, the injection could take place $\Delta\theta$ earlier. The control unit thus will advance by $\Delta\theta$, the initiation of injection for the next stroke. As a servo system, tracking will occur until the injection initiation produces a cylinder pressure of $P_o$ at TDC. The desired value $P_o$ can be changed or programmed in the microprocessor.

EXAMPLE 1

An internal combustion engine with fuel injection and injection of highly compressed oxygen operates under the following conditions:

Overall thermal efficiency = 30%

Fuel injected, then gas injected.

600 RPM 50 h.p. developed.

It is found that 0.022 cubic inch of gasoline is injected each stroke. Approximately 0.16 milliseconds are available for injection of the fuel during the period the piston travels 1% of the stroke at TDC. The fuel injection rate is found to be about 135 cubic inches per second. For a hot engine, it is found that injection can start +5 degrees prior to TDC with a cylinder pressure slightly less than 5 atm. at TDC, which level is considered acceptable. The highly compressed gas oxidant is injected starting at TDC and, therefore, presents no back pressure on the piston.

EXAMPLE 2

An engine that is similar to that in Example 1, except it is desired to develop only 5 h.p. at 600 RPM. This is accomplished by injecting fuel and oxidant only every 10th. power stroke. The control unit came to equilibrium under slightly different conditions due to different torque, friction losses, etc. It was found that the control system started fuel injection at 5.6° prior to TDC with a cylinder pressure slightly less than 5 atmospheres at TDC. Fuel injection rates were about the same as Example 1 (135 cubic inch per second).

EXAMPLE 3

An all liquid engine uses the following recipe:

1 pound gasoline 1 pound water 4.8 pounds nitric acid

Acid plus water injected as one fluid.

It is found that 640 cubic inches of nitric acid/water mixture per second for an injection period of 0.16 milliseconds were required as was 135 cubic inches of gasoline per second to achieve 50 h.p. at 600 RPM. Optimum conditions were found to occur with 3 atmospheres cylinder pressure at TDC. Equilibrium was reached in the control system where fuel was started at 0.3 milliseconds prior to TDC, and stopped at 0.14 milliseconds prior to TDC. Oxidant mixture started at 0.14 milliseconds prior to TDC and stopped at 0.02 milliseconds after TDC. Total thermal efficiency was found to be 50%.

EXAMPLE 4

The engine of Example 3 was increased to 5000 h.p. The fluid injection rates were increased ten-fold and the injection periods were slightly reduced. The thermal efficiency was slightly increased and injection initiation times for both fuel and oxidant were advanced 0.05 milliseconds.

EXAMPLE 5

In one engine it was discovered that during idle conditions it was most important to have no compression in the engine cylinder while loss of some expansion ratio was not critical. The reverse was true at full throttle, i.e., modest amounts of compression were tolerable, but full expansion ratio was essential. To satisfy these conditions a pressure of only 1.5 atmosphere in the cylinder was programmed for idle conditions and 10 atmospheres at full throttle. A proportionate pressure was programmed for part load, i.e., 5 atmospheres at ½ throttle. These pressures of 1.5, 10, and 5 atmospheres represent cylinder pressure at TDC. The control system was found to equilibrate as follows for a liquid oxidant engine:

| | |
|---|---|
| Idle | Full injection starts at 1 degree before TDC. Oxidant injection starts at TDC. |
| Full Throttle | Fuel injection starts at 10 degrees before TDC. Oxidant injection starts at 5 degrees before TDC. |

This engine was similar to the engine of Example 3.

EXAMPLE 6

In one engine configuration it was found that desirable cylinder pressure at TDC ($P_o$ in FIG. 3) changed by +10% for each 50° F. rise in cylinder wall temperature. It was possible to simply account for this by selecting the pressure transducer that has a −10% error for each 50° F. rise in ambient temperature.

What is claimed is:

1. An internal combustion engine system including a combustion chamber in which a piston reciprocates through a cycle between a top dead center position defining a chamber volume $V_1$ and a bottom dead center position defining a chamber volume $V_2$, including:

injector means to introduce liquid fuel and liquid oxidant to said combustion chamber, ignition means to initiate combustion of said fuel with said oxidant, control means rendered operable, as determined by the position of said piston in said cycle, to respond to the pressure within said combustion chamber to signal the operation of said injector means and of said ignition means, said volume $V_1$ being a minimal volume required to contain said liquid fuel and liquid oxidant to maximize the expansion ratio $V_2/V_1$ of said chamber.

2. An internal combustion engine system as defined in claim 1 in which said control means is rendered operable substantially at the top dead center position of said piston.

* * * * *